United States Patent
Ranjan et al.

(10) Patent No.: US 9,633,220 B2
(45) Date of Patent: Apr. 25, 2017

(54) PREVENTING AN UNAUTHORIZED PUBLICATION OF A MEDIA OBJECT

(75) Inventors: Amit Ranjan, Karnataka (IN); Praphul Chandra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 13/595,389

(22) Filed: Aug. 27, 2012

(65) Prior Publication Data

US 2013/0329968 A1    Dec. 12, 2013

(30) Foreign Application Priority Data

Jun. 11, 2012   (IN) .......................... 2315/CHE/2012

(51) Int. Cl.
*G06K 9/00*    (2006.01)
*G06F 21/62*   (2013.01)

(52) U.S. Cl.
CPC ................................ *G06F 21/6245* (2013.01)

(58) Field of Classification Search
CPC .......... G06F 17/30781; G06F 21/6245; G06K 2009/0059
USPC ....... 382/118, 100, 215, 275, 282; 726/1, 26
See application file for complete search history.

(56) References Cited

U.S. PATENT DOCUMENTS

| 7,779,117 B2 | 8/2010 | Tessman, Jr. et al. |
| 2010/0080410 A1 | 4/2010 | Deluca et al. |
| 2011/0122255 A1 | 5/2011 | Haritaoglu |
| 2011/0202968 A1* | 8/2011 | Nurmi .............................. 726/1 |

FOREIGN PATENT DOCUMENTS

| JP | 2007096608 | 4/2007 |
| WO | WO-2010123359 | 10/2010 |

* cited by examiner

*Primary Examiner* — Manuchehr Rahmjoo
(74) *Attorney, Agent, or Firm* — HP Inc. Patent Department

(57) ABSTRACT

Provided is a method of preventing an unauthorized publication of a media object. On receipt of a user request to prevent an unauthorized publication of a media object, a video link is established with the user. An image of the user is received from the video link and a determination is made whether the image of the user correspond with an image in the media object. Based on said determination an action is performed with regard to the unauthorized publication of the media object.

19 Claims, 3 Drawing Sheets

PREVENTING AN UNAUTHORIZED PUBLICATION OF A MEDIA OBJECT

CLAIM FOR PRIORITY

The present application claims priority under 35 U.S.C 119 (a)-(d) to Indian Patent application number 2315/CHE/2012, filed on Jun. 11, 2012, which is incorporated by reference herein its entirety.

BACKGROUND

The Web has become a popular medium for people to share information and content with other people. There are many media sharing websites (for example, Picasa, YouTube, and Flickr) and social networking websites (for example, Facebook and LinkedIn) that allow users to share text, images, audio and video with friends, family, and other acquaintances. Typically, all a user requires is an internet connected device and a computer application (for example, a web browser) to upload a media content of his choice to the Web.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

People are increasingly using the Internet and the World Wide Web (or the Web) to connect and share information with other people. In one example, information can be shared with others by creating and publishing a website, which could contain media (such as text, images, audio and/or video) of an author's liking. In another example, a user may share content with other people by using a media sharing website (such as YouTube) or a social networking website (such as LinkedIn). Considering the options available, it has become quite simple to share content over a computer network such as the Internet.

One offshoot of the simplicity with which content can be shared online with others is the issue of privacy. Typically, it is the user who decides whether the content that he or she has uploaded is meant for private viewing (such as for a select group of friends, family, or acquaintances) or for public at large. However, there may be instances where a user may like to restrict the viewing of media to only a select group of people. The user may not like to have the media shared with rest of the public without authorization. To provide an illustration, there may be images (photographs) of a user which the user may not like to share with everyone. An example of such an image may include a photograph where a user is partaking in some activity (like smoking or drinking) which may be considered a vice by others. Another example may include images of a young child or baby of a well known individual (such as a sports person or movie actor) who may not like such images to be shared with other people without due consent.

Due to the ease with which content can be shared online, people often upload and share media such as photographs or videos of other individuals without their authorization. Needless to say, such acts may not be acceptable to the individuals whose photographs or images have been shared and may lead to privacy issues.

Proposed is an approach to remove an unauthorized publication of a media object from a computer network (such as the Internet). The proposed approach includes receiving a request from a user for removing an unauthorized publication of a media object from a host computer. Upon receipt of such request, a video link is established between the host computer and the user's computer system, and an image of the user is obtained from the video link. Next, a comparison is made between the image of the user and an image(s) present in the media object. If the image of the user corresponds with an image in the media object, the unauthorized publication of the media object is removed.

As used herein, the term "media object" (used interchangeably with the term "media") includes an image (for example, a photograph), audio, video, text, animation, or a combination thereof.

Figure 1:
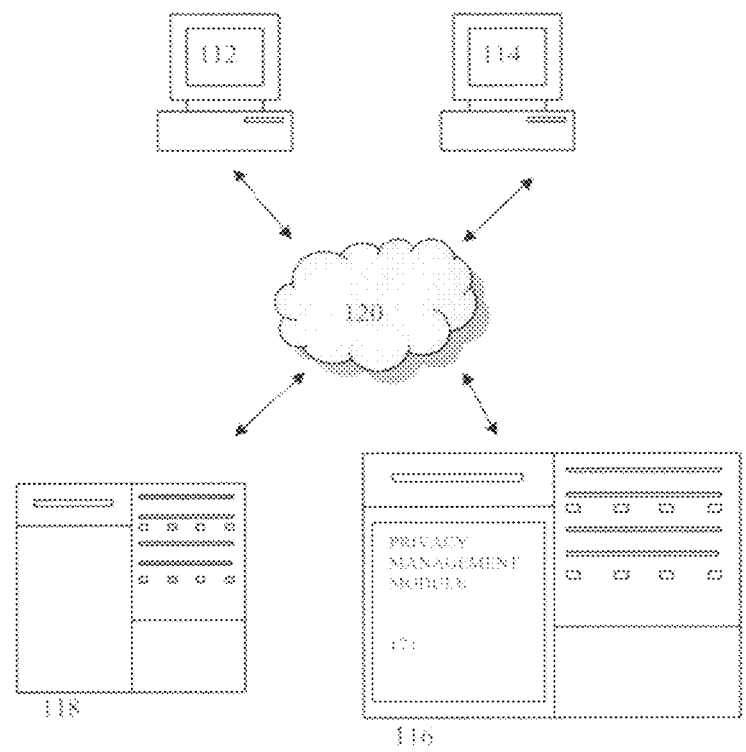
FIG. 1 shows a system for preventing an unauthorized publication of a media object, according to an example.

FIG. 1 shows a system for preventing an unauthorized publication of a media object, according to an example. Referring to FIG. 1, system 100 includes a network of computer systems 112, 114, 116 and 118 connected through a computer network 120. Computer network 120 may include connections, such as wire, wireless communication links, or fiber optic cables. In an implementation, computer network 120 is the Internet. However, in other implementations it may be an intranet, a local area network (LAN), wide area network (WAN), or the like.

In the illustrated example, computer systems 112 and 114 are client computer systems, whereas computer systems 116 and 118 are server computers. Client computer systems 112 and 114 may be, for example, a personal computer, desktop computer, notebook computer, tablet computer, mobile phone, personal digital assistant (PDA), or the like. Server computers 116 and 118 may be a web server, FTP (File transfer protocol) server, virtual server, or the like. In an implementation, server computers 116 and 118 may host media objects, such as photographs and videos. In an implementation, these media objects may form a part of a website which may also be hosted on server computers 116 and/or 118. Examples of a web site may include, without limitation, a media sharing site or social networking site.

In an implementation, server computer 116 and/or 118 may include a privacy management module 122. Privacy management module 122 participates in preventing an unauthorized publication of a media object. In the example illustration of FIG. 1, privacy management module 122 is present on server computer 116. However, in other examples, privacy management module 122 could be present on another server computer such as server computer 118, or a server computer coupled to server computers 116 and/or 118 over a computer network. In another implementation, privacy management module 122 may be present as a distributed program (machine readable instructions) across more than one server computers. For example, components or functions of privacy management module may be distributed across server computers 116 and 118.

In an implementation, if server computer 116 receives a request from a user for preventing an unauthorized publication of a media object, privacy management module 122 establishes a video link with the user upon receipt of such request. Once the video link is established, privacy management module 122 obtains an image of the user from the video link and determines whether the image of the user corresponds with an unauthorized publication of a media object (for instance, an image or video). In case there's a match between the user image and an image in the media object, privacy management module 122 blocks or removes unauthorized publication of the media object. In an implementation, once the unauthorized publication is blocked or deleted, the user is informed about the action.

In an example, an unauthorized publication of a media object may include an image of the user only. In other examples, however, additionally, the unauthorized publication may include images of other individuals (which may be known and/or unknown to a user) and/or objects (which may be animate or inanimate. For example, a tree, bottle, an animal, etc.).

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system. Further, system 100 may include additional client computer systems, computer servers, and other devices.

Figure 2:
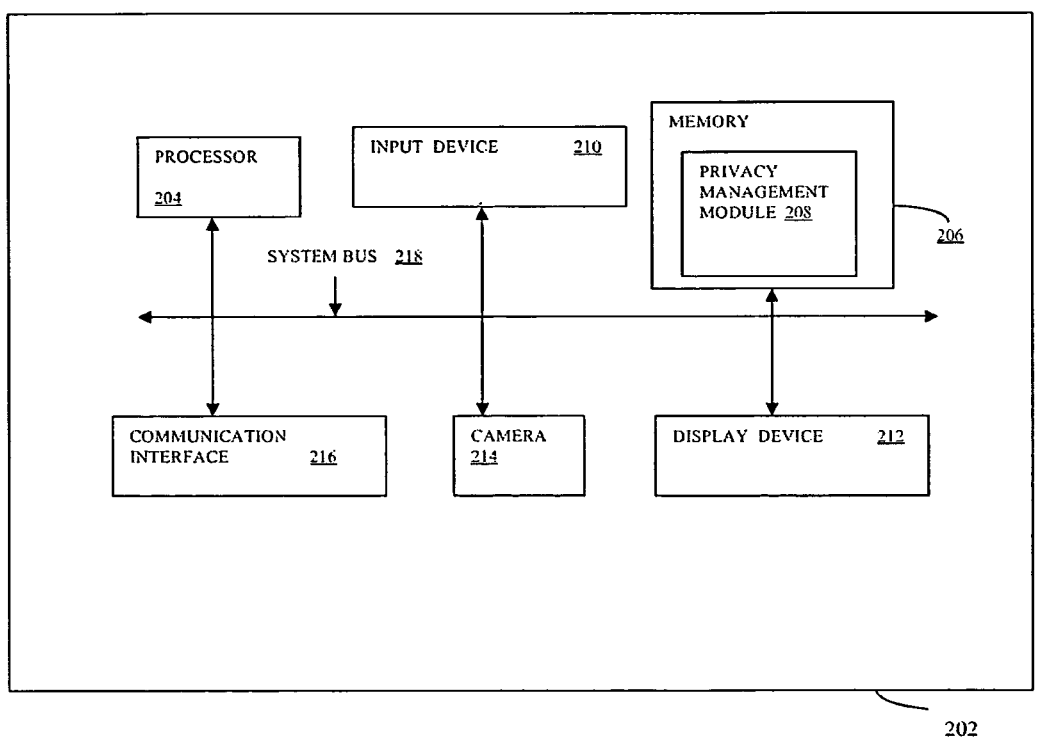
FIG. 2 shows a block diagram of a computer system for preventing an unauthorized publication of a media object, according to an example.

FIG. 2 shows a block diagram of a computer system for preventing an unauthorized publication of a media object, according to an example.

Computer system 202 may be a desktop computer, notebook computer, tablet computer, computer server, mobile phone, personal digital assistant (PDA), or the like.

Computer system 202 may include processor 204, memory 206, privacy management module 208, input device 210, display device 212, camera 214 and a communication interface 216. The components of the computing system 202 may be coupled together through a system bus 218.

Processor 204 may include any type of processor, microprocessor, or processing logic that interprets and executes instructions.

Memory 206 may include a random access memory (RAM) or another type of dynamic storage device that may store information and instructions non-transitorily for execution by processor 204. For example, memory 206 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 206 may include instructions that when executed by processor 204 implement privacy management module 208.

Privacy management module 208 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

In an implementation, privacy management module 208 may be read into memory 206 from another computer-readable medium, such as data storage device, or from another device via communication interface 216.

Input device 210 may include a keyboard, a mouse, a touch-screen, or other input device. Input device 210 allows a user to request a host computer to remove an unauthorized publication of a media object.

Display device 212 may include a liquid crystal display (LCD), a light-emitting diode (LED) display, a plasma display panel, a television, a computer monitor, and the like. Display device 212 allows a user to identify an unauthorized publication of a media object, request for its removal and ascertain post-request whether the unauthorized publication of the media object has been removed.

Camera 214 may include a web camera, a digital camera, a video camera, and the like. Camera 214 is capable of capturing and sharing an image of a user with a remote computer system. It also allows a remote computer system to establish a video link with a user's computer system.

Communication interface 216 may include any transceiver-like mechanism that enables computing device 202 to communicate with other devices and/or systems via a communication link. Communication interface 216 may be a software program, a hard ware, a firmware, or any combination thereof. Communication interface 216 may provide communication through the use of either or both physical and wireless communication links. To provide a few non-limiting examples, communication interface 216 may be an Ethernet card, a modem, an integrated services digital network ("ISDN") card, etc.

It would be appreciated that the system components depicted in FIG. 2 are for the purpose of illustration only and the actual components may vary depending on the computing system and architecture deployed for implementation of the present solution. The various components described above may be hosted on a single computing system or multiple computer systems, including servers, connected together through suitable means.

Figure 3:
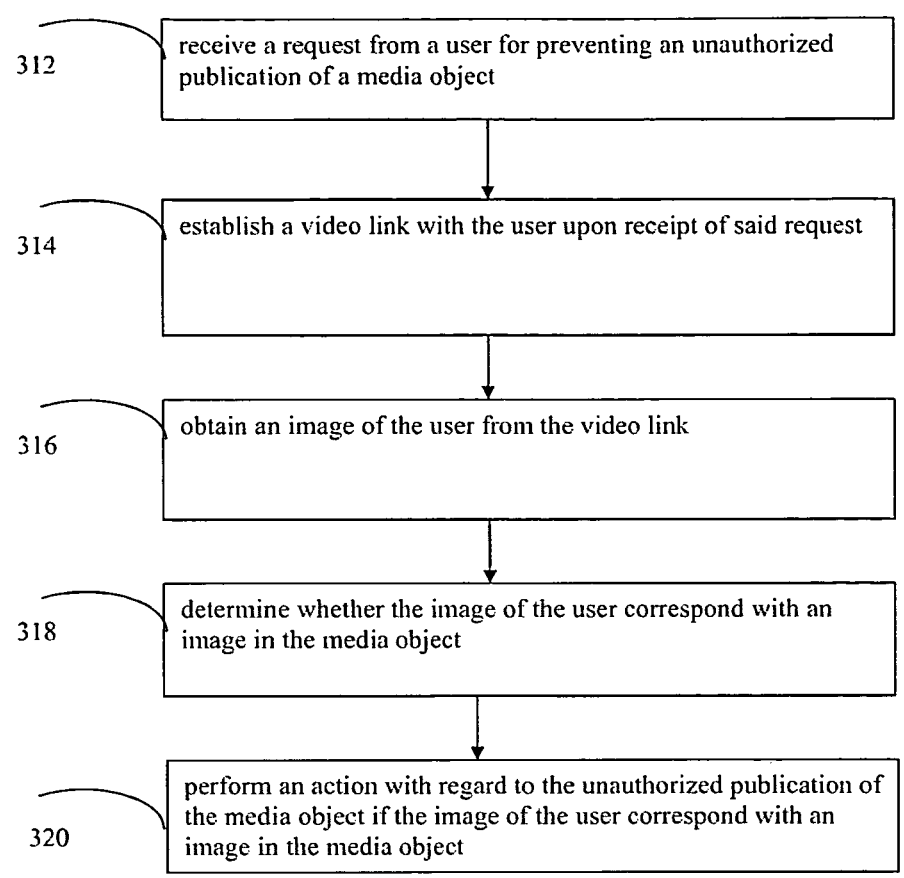
FIG. 3 shows a flowchart of a method of preventing an unauthorized publication of a media object, according to an example.

FIG. 3 shows a flowchart of a method of preventing an unauthorized publication of a media object, according to an example. As illustrated in FIG. 1, at block 312, a computer system receives a request from a user for preventing an unauthorised publication of a media object. In an implementation, a user's computer system receives a request from the user for preventing an unauthorised publication of a media object, which may be present on a remote host computer (such as a computer server). The user's computer system routes the user's request to the host computer which may be coupled to the user's computer system through a computer network (such as the Internet). In another implementation, the host computer may directly receive the user's request for preventing an unauthorised publication of a media object.

A user interface may be used to obtain a request from a user for preventing an unauthorised publication of a media object. In an implementation, the user interface is a web-interface which is provided by a host computer (hosting the unauthorised publication of the media object). For example, if the unauthorized publication is associated with a social networking site then the user interface of the social networking site may be used to obtain a user's request.

The remote host computer may host a media sharing website or social networking website and the unauthorised publication of the media object is a component of such websites. For example, a media object could be a photograph or video, which may be present on a media sharing website (such as Picasa) or social networking website (such as Facebook).

In an implementation, a privacy management module (which may be present on a user's computer system, host computer system, or another computer system coupled to either or both of the aforesaid computer systems) receives a request from a user for removing or deleting an unauthorised publication of a media object.

At block 314, upon receipt of a user's request for preventing an unauthorised publication of a media object, the privacy management module establishes a video link between the user's computer system and the host computer (which is hosting the unauthorised publication of the media object). In an implementation, prior to establishing a video link with the user's computer system, the host computer requests for a authorization from the user, and initiates a video link with the user's computer system only after user's assent. Upon user's consent, a video link is established between a communication interface of the user's computer system and a communication interface of the host's computer system. Once a video link is created, real time video images of a user could be obtained by the host computer system.

At block 316, an image of the user is extracted from the video link that is established between the user's computer system and the host computer system. In an implementation, the image includes a facial image (comprising facial features) of the user. However, in other implementation, other physical features of the user may also be extracted from the video link.

A video image extractor program may be used to extract the user's image from the video link. In an implementation, the video image extractor program is a component of the privacy management module.

At block 318, a comparison is made between an image of the user extracted from the video link and the unauthorised publication of the media object. An image comparison program is used to make a comparison between an image of the user and the unauthorised publication of the media object. In an implementation, the image comparison program is a component of the privacy management module.

At block 320, if upon comparison it is found that an image of the user from the video link corresponds with an image in the unauthorised publication of the media object, an action is performed with regard to the unauthorized publication of the media object. In an implementation, said action includes blocking of the unauthorized publication of the media object so that it is not visible to any user any more. In another implementation, said action includes removing or deleting the unauthorized publication of the media object. The privacy management module may perform either of the aforesaid actions. To provide an illustration, a media sharing website may delete an unauthorised publication of a media object, if upon comparison it is found that the user's image is present in the unauthorised publication.

In an implementation, prior to deleting an unauthorised publication of the media object, the host computer may request for an authorization (consent) from the user, and initiate removal of the media object only after user's assent. In a further implementation, a communication is sent to the user once the unauthorized publication of the media object has been blocked or removed. The communication may be in the form of an email, a mobile text message, an instant message, a social media post, a website post, and the like.

In another implementation, the user interface used to obtain a request from a user for preventing an unauthorised publication of a media object and the privacy management module are components of a widget program or application.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of preventing an unauthorized publication of a media object, comprising:
  receiving a request from a user for preventing the unauthorized publication of the media object;
  establishing a video link with the user upon receipt of said request;
  obtaining an image of the user from the video link;
  determining, by at least one processor, whether the image of the user correspond with an image in the media object; and
  performing an action with regard to the unauthorized publication of the media object if the image of the user correspond with an image in the media object.

2. The method of claim 1, wherein the action with regard to the unauthorized publication of the media object includes blocking or removing the unauthorized publication of the media object.

3. The method of claim 1, wherein the image of the user includes facial features of the user.

4. The method of claim 1, wherein the unauthorized publication of the media object is present on a remote computer coupled to a user's computer through a computer network.

5. The method of claim 1, wherein the unauthorized publication of the media object is present on a social networking web site or media sharing web site.

6. The method of claim 1, wherein the unauthorized publication of the media object includes an image or video.

7. The method of claim 1, further comprising obtaining an authorization from the user prior to establishing the video link.

8. The method of claim 1, further comprising obtaining an authorization from the user prior to performing the action with regard to the unauthorized publication of the media object.

9. The method of claim 1, further comprising communicating to the user the action performed with regard to the unauthorized publication of the media object.

10. A system to prevent an unauthorized publication of a media object, comprising:
  a user interface to receive a request from a user to prevent the unauthorized publication of the media object;
  a camera to establish a video link with the user upon receipt of said request; and
  a privacy management module to:
  obtain an image of the user from the video link;
  determine whether the image of the user correspond with an image in the media object; and
  perform an action with regard to the unauthorized publication of the media object if the image of the user correspond with an image in the media object.

11. The system of claim 10, wherein the user interface is a web-based interface.

12. The system of claim 10, wherein the user interface and the privacy management module are components of a widget.

13. The system of claim 10, wherein the privacy management module is present on a remote computer coupled to a user's computer through a computer network.

14. The system of claim 10, wherein the image of the user includes physical attributes of the user.

15. The system of claim 10, wherein the privacy management module is to establish the video link if an authorization is obtained from the user.

16. The system of claim 10, wherein the privacy management module is to communicate the action performed with regard to the unauthorized publication of the media object.

17. A non-transitory computer readable medium, the non-transitory computer readable medium comprising machine executable instructions, the machine executable instructions when executed by a computer system causes the computer system to:

receive a request from a user for preventing an unauthorized publication of a media object;
establish a video link with the user upon receipt of said request;
obtain an image of the user from the video link;
determine whether the image of the user correspond with an image in the media object; and
perform an action with regard to the unauthorized publication of the media object if the image of the user correspond with an image in the media object.

18. The non-transitory computer readable medium of claim 17, wherein the machine executable instructions when executed by the computer system causes the computer system to establish the video link if an authorization is obtained from the user.

19. The non-transitory computer readable medium of claim 17, wherein the machine executable instructions when executed by the computer system causes the computer system to communicate the action performed with regard to the unauthorized publication of the media object.

* * * * *